US011777942B2

(12) United States Patent
Boodaei et al.

(10) Patent No.: US 11,777,942 B2
(45) Date of Patent: Oct. 3, 2023

(54) TRANSFER OF TRUST BETWEEN AUTHENTICATION DEVICES

(71) Applicant: Transmit Security Ltd., Tel-Aviv (IL)

(72) Inventors: Michael Boodaei, Givatayim (IL); Eldan Ben-Haim, Kiryat Ono (IL); Dima Polsky, Tel-Aviv (IL)

(73) Assignee: Transmit Security Ltd., Tel-Aviv (IL)

( * ) Notice: Subject to any disclaimer, the term of this patent is extended or adjusted under 35 U.S.C. 154(b) by 164 days.

(21) Appl. No.: 17/114,684

(22) Filed: Dec. 8, 2020

(65) Prior Publication Data

US 2022/0182388 A1    Jun. 9, 2022

(51) Int. Cl.
*H04L 9/40* (2022.01)
(52) U.S. Cl.
CPC ........ *H04L 63/102* (2013.01); *H04L 63/0884* (2013.01)
(58) Field of Classification Search
CPC .......................... H04L 63/102; H04L 63/0884
See application file for complete search history.

(56) References Cited

U.S. PATENT DOCUMENTS

| | | | | |
|---|---|---|---|---|
| 2002/0034301 | A1* | 3/2002 | Andersson | G06F 21/43 380/270 |
| 2003/0115142 | A1* | 6/2003 | Brickell | G07C 9/22 705/51 |
| 2013/0047214 | A1* | 2/2013 | Radhakrishnan | G06F 21/335 726/4 |
| 2017/0250972 | A1* | 8/2017 | Ronda | H04L 9/0891 |
| 2022/0182388 | A1* | 6/2022 | Boodaei | H04L 63/0861 |
| 2022/0230500 | A1* | 7/2022 | Matysiak | H04L 63/0853 |

OTHER PUBLICATIONS

Adhatrao et al. "A Secure Method for Signing In Using Quick Response Codes With Mobile Authentication", International Journal of Student Research in Technology & Management, 1(1): 1-11, 2015.

* cited by examiner

*Primary Examiner* — Ponnoreay Pich

(57) ABSTRACT

Disclosed herein are methods and systems for transferring trust between authentication devices associated with the same user. The user accessing secure online resource(s) uses a first (authentication) client device which is not yet associated (verified) with the user for accessing the secure online resource(s). In response to receiving an authentication request from the client device, an authentication message is transmitted to the first client device. The authentication message is transferred from the first client device to a second client device already associated (verified) with the user for accessing the secure online resource(s). The second authenticator transmits back the authentication message which may be verified against the authentication message transmitted to the first client device. In case of successful verification, the first authenticator is associated with the user and enabled for authenticating the user when accessing for secure online resource(s) based on identity assurance indicator(s) verified for the second client device.

17 Claims, 5 Drawing Sheets

TRANSFER OF TRUST BETWEEN AUTHENTICATION DEVICES

FIELD AND BACKGROUND OF THE INVENTION

The present invention, in some embodiments thereof, relates to authenticating a user requesting to access a secure online service, and, more specifically, but not exclusively, to associating an authentication device used by a user for accessing a secure online resource based on another authentication device already associated with the user.

Access to secure online and/or offline resources is often subject to user authentication in which the user is required to provide evidence to prove his identity. Reliable authentication may be a major concern when accessing secure online services, secure systems, secure platforms and/or the like such as, for example, online finance services (e.g. banking services, credit/debit card services, etc.), remote access applications, entertainment content streaming services, social networks and/or the like.

User authentication may be carried out by a plurality of methods, techniques and/or implementations employing various paradigms, for example, knowledge based authentication, item possession and/or association authentication and/or the like such as, for example, static password authentication, dynamic One Time Password (OTP) authentication, biometric authentication, key authentication and/or the like and in some cases multiple such authentication methods may be further combined.

Each of these methodologies and implementations may impose a certain amount of effort on the user to authenticate himself while ensuring a certain level of confidence in the user's identity when successfully authenticated.

SUMMARY OF THE INVENTION

According to a first aspect of the present invention there is provided a method of associating an authentication device with a user using another authentication device already associated with the user, comprising using one or more processors for:
  Receiving an authentication request from a first authenticator executed by a first client device used by a user for accessing one or more secure online resources. The first authenticator is not associated with any user.
  Transmitting an authentication message to the first authenticator.
  Receiving the authentication message from a second authenticator executed by a second client device used by the user after the authentication message is transferred from the first authenticator to the second authenticator indicating that both the first authenticator and the second authenticator are controlled by the user. The second authenticator is already associated with the user based on one or more identity assurance indicators verified for the user.
  Associating the first authenticator with the user in case the received authentication message is valid.
  Enabling the first authenticator to authenticate the user for accessing one or more of the secure online resources based on one or more of the identity assurance indicators.

According to a second aspect of the present invention there is provided an authentication system for associating an authentication device with a user using another authentication device already associated with the user, comprising a program store storing a code and one or more processors of an authentication system coupled to the program store for executing the stored code. The code comprising:
  Code instructions to receive an authentication request from a first authenticator executed by a first client device used by a user for accessing one or more secure online resources. The first authenticator is not associated with any user.
  Code instructions to transmit an authentication message to the first authenticator.
  Code instructions to receive the authentication message from a second authenticator executed by a second client device used by the user after the authentication message is transferred from the first authenticator to the second authenticator indicating that both the first authenticator and the second authenticator are controlled by the user. The second authenticator is already associated with the user based on one or more identity assurance indicators verified for the user.
  Code instructions to associate the first authenticator with the user in case the received authentication message is valid.
  Code instructions to enable the first authenticator to authenticate the user for accessing one or more of the secure online resources based on one or more of the identity assurance indicators.

According to a third aspect of the present invention there is provided a method of associating an authentication device with a user using another authentication device already associated with the user, comprising using one or more processors for:
  Receiving an authentication request from a first authenticator executed by a first client device used by a user for accessing one or more secure online resources. The first authenticator is not associated with any user.
  Receiving identification information identifying a second authenticator executed by a second client device used by the user, the second authenticator is already associated with the user based on one or more identity assurance indicators verified for the user.
  Transmitting an authentication message to the second authenticator.
  Receiving a response to the authentication message from the second authenticator within a predefined time period.
  Associating the first authenticator with the user.
  Enabling the first authenticator to authenticate the user for accessing one or more of the secure online resources based on one or more of the identity assurance indicator.

According to a fourth aspect of the present invention there is provided a method of authenticating biometrically a user using a client device lacking suitable biometric sensors for accessing a secure online resource, comprising using one or more processors for:
  Receiving an authentication request indicative of a user using a first client device for accessing one or more secure online resources requiring biometric authentication based on one or more biometric signatures of the user. The first client device is not equipped with a biometric sensor suitable for authenticating the user based on the one or more biometric signatures.
  Transmitting, to the first client device, a code comprising a link to an authentication webpage, the code is transferred to a second client device associated with the user which is equipped with the suitable one or more biometric sensors. Wherein after successfully authenticating the user based on the at least biometric signature, the second client device transmits an authentication confirmation by browsing to the authentication webpage using a native browser inherently installed in the second client device with the link extracted from the code.

Receiving the authentication confirmation from the second client device using the authentication webpage.

Granting the user access to one or more of the secure online resources.

In an optional implementation form of the first and/or second aspects, the authentication message is transmitted to the second authenticator and associating the first authenticator with the user after receiving, from the first authenticator, the authentication message transferred from the second authenticator to the first authenticator.

In a further implementation form of the first, second and/or third aspects, the first authenticator is enabled to authenticate the user based on the one or more identity assurances indicator during subsequent future accesses of the user to one or more of the secure online resources.

In a further implementation form of the first, second and/or third aspects, the authentication message transmitted to the second authenticator is a member of a group consisting of: secret code and a randomly generated code assigned with an expiration time period.

In a further implementation form of the first and/or second aspects, the authentication message is transferred from the first authenticator to the second authenticator by the user who receives the authentication message via the second authenticator.

In a further implementation form of the first and/or second aspects, the authentication message is transferred from the first authenticator to the second authenticator via one or more communication channels established between the first client device and the second client device.

In a further implementation form of the first and/or second aspects, the message is transferred from the first authenticator to the second authenticator via an attachable storage media which is first attached to the first client device to enable the first authenticator to store the authentication message in the attachable storage media followed by detaching the attachable storage media from the second client device and attaching the attachable storage media to the second client device to enable the second authenticator to retrieve the authentication message from the attachable storage media.

In a further implementation form of the first, second and/or third aspects, each of the one or more identity assurance indicators is uniquely associated with the user to enable authentication of the user by verifying its associated one or more identity assurance indicators.

In a further implementation form of the first, second and/or third aspects, each of the one or more identity assurance indicators is initially verified for the user through a legacy authentication process applied to exclusively associate each identity assurance indicator with the user.

In a further implementation form of the first, second and/or third aspects, the first authenticator and the second authenticator are initially each logged in a respective authenticator record maintained for the user, a first authenticator record lists each identity assurance indicator verified for the user using the first authenticator and a second authenticator record lists each identity assurance indicator verified for the user using the second authenticator.

In an optional implementation form of the first, second and/or third aspects, a plurality of authenticator records are maintained, each for a respective one of a plurality of authenticators associated with the user.

In an optional implementation form of the first, second and/or third aspects, based on consent of the user, the first authenticator is associated with the second authenticator and the first authenticator record and the second authenticator record are unified into a single unified authenticator record, the unified authenticator record lists a union of all identity assurance indicator listed in the first authenticator record and the second authenticator record.

In an optional implementation form of the first, second and/or third aspects, the unified authenticator record is updated to include each additional identity assurance indicator verified for the user using the first authenticator or the second authenticator such that the respective additional identity assurance indicator is valid for both the first authenticator and the second authenticator.

In an optional implementation form of the first, second and/or third aspects, a plurality of authenticator records are maintained for a plurality of users accessing one or more of the secure online resources. Each of the plurality of authenticator records list (a) one or more authenticators associated with the respective user and (b) each identity assurance indicator verified for the respective user using the respective associated authenticator.

In an optional implementation form of the first, second and/or third aspects, an authentication service is provided, based on the plurality of authenticator records maintained for the plurality of users, for accessing a plurality of secure online resources.

In a further implementation form of the fourth aspect, the code comprises a QR code which is presented on a screen of the first client device and scanned by the second client device using one or more imaging sensors of the second client device.

In a further implementation form of the fourth aspect, the code is transferred to the second client device via one or more communication channels established between the first client device and the second client device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
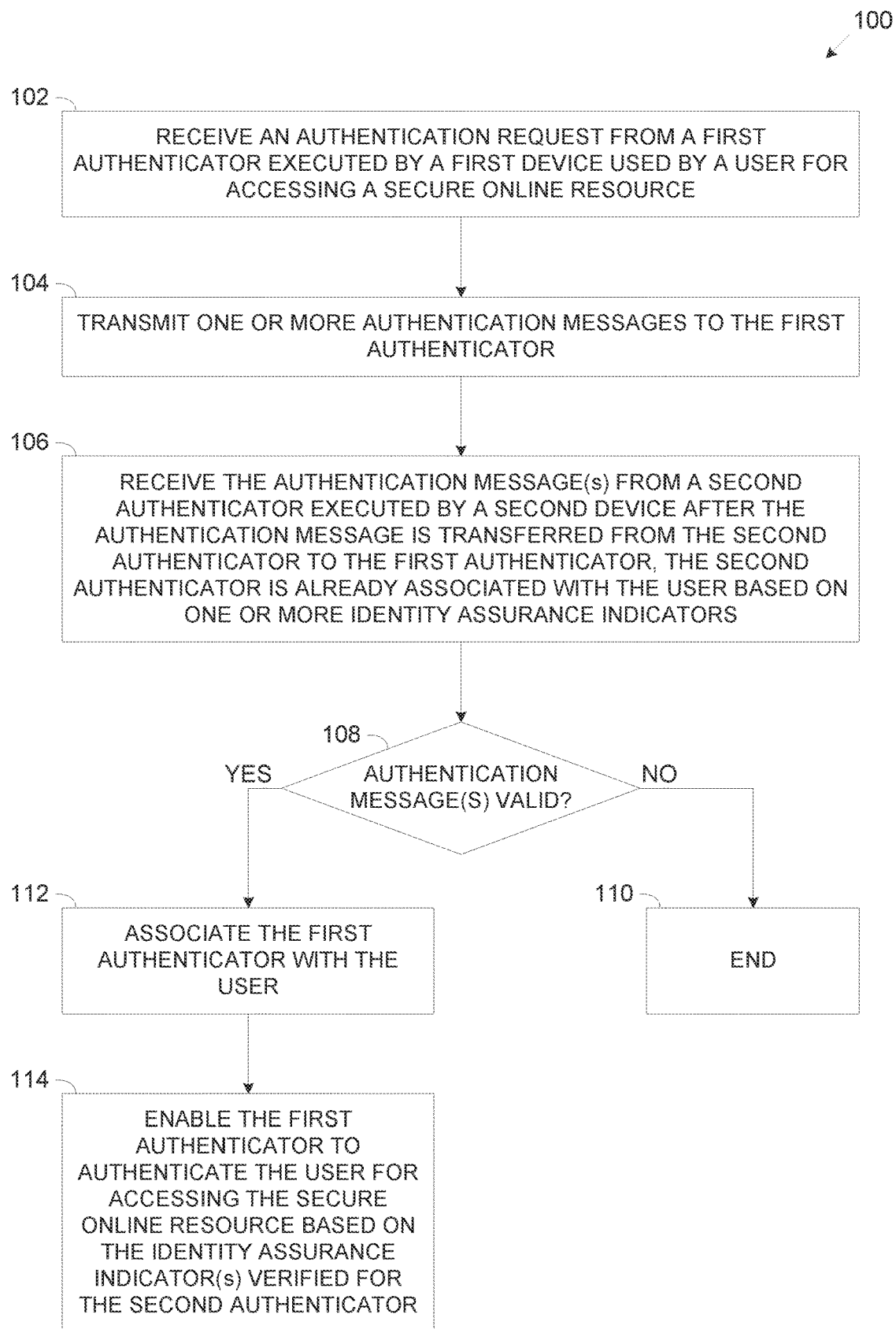
FIG. 1 is a flowchart of an exemplary process of associating an authentication device used by a user for accessing a secure online resource based on another authentication device already associated with the user, according to some embodiments of the present invention.

The present invention, in some embodiments thereof, relates to authenticating a user requesting to access a secure online service, and, more specifically, but not exclusively, to associating an authentication device used by a user for accessing a secure online resource based on another authentication device already associated with the user.

According to some embodiments of the present invention, there are provided methods, systems, devices and computer software programs for transferring trust between authenticators executed by client devices serving as authentication devices for authenticating a user accessing, via one or more networks, one or more secure online resources. Such secure online resources may include, for example, an online finance service (e.g. a banking service, a credit/debit card service, etc.), a remote access system, an entertainment content streaming service, a social media platform, a subscription service and/or the like.

The authenticators may be implemented by software modules, hardware modules and/or a combination thereof are executed by the (authentication) client devices, for example, a server, a desktop computer, a laptop computer, a Smartphone, a tablet, a proprietary client device and/or the like. The authenticators may employ one or more authentication processes for authenticating the user based on one or more authentication data items, for example, a password, a biometric signature and/or the like.

However, one or more of the authenticators may be further associated with the user based on one or more identity assurance indicators uniquely associated with the user which are verified for each of the authenticators and thus bind (associate) the respective authenticator to the user. The identity assurance indicators may be established based on one or more authentication methods and/or modalities as known in the art, for example, a secret known only to the user (e.g. secret code, password, etc.), a device and/or resource in exclusive possession of the user (e.g. ID document, phone number, email account, key device, etc.), a biometric signature of the user (e.g., fingerprint, iris, face, voice. Etc.) and/or the like.

The trust transfer may be applied to associate (verify) a first client device executing a first authenticator for authenticating the user accessing the secure online resource(s) with the user based on a second authenticator executed by a second client device which is already associated (verified) with the user based on one or more of the identity assurance indicators of the user, meaning that one or more of the identity assurance indicators of the user are were already verified in the past for the second authenticator.

The second authenticator may have been associated with the user using one or more methods, for example, during one or more legacy authentication sessions and/or processes as known in the art, for example, an online authentication session, an in-person authentication phone call, physical visit to an authentication office and/or the like. In another example, the second authenticator may have been associated with the user during a trust transfer process in which trust was transferred to the second authenticator from a third authenticator.

The trust transfer process may be conducted by an authentication management system which may be utilized by one or more computing platforms, for example, a server, a cluster of computing nodes, a cloud service, a cloud platform, a cloud application and/or the like. The trust transfer is based on transmitting one or more authentication messages to one of the two authenticators (i.e., first and second authenticators) and receiving the authentication message(s) from the other authenticator. This means that the authentication message(s) are used to correlate the two authenticators with each other during a certain trust transfer session. The authentication message(s) may therefore include a code, a session ID (identifier) and/or the like to uniquely identify the trust transfer session and the involved authenticators, i.e., the first and the second authenticators.

The trust transfer process may start after the user is successfully authenticated, separately, by both the first authenticator and the second authenticator through one or more of the authentication processes based on one or more of the authentication data items (e.g. password, biometric signature, etc.). After the user is successfully authenticated by the first authenticator, the authentication management system transmits the authentication message(s) to the first authenticator. Alternatively, the authentication management system transmits the authentication message(s) to the second authenticator after the user provides information identifying the second authenticator, for example, a phone number, an email address and/or the like to enable a remote authentication management system to transmit the authentication message(s) to the second authenticator.

Assuming the first and second client devices are accessible to the user and the both the first and second authenticators are controllable by the user, the authentication message(s) may be transferred from the first authenticator to the second authenticator or alternatively from the second authenticator to the first authenticator depending on which authentication device initially received the authentication message(s).

Transferring the authentication message(s) may be done using one or more methods. For example, the authentication message(s) may include a textual secret code which may be transferred by the user serving as intermediator. In another example, the authentication messages(s) may include a QR code which may be displayed by one client device (e.g. the first client device) and scanned by the other client device (e.g. the second client device). In another example, the authentication message(s) may be transferred via one or more wired and/or wireless communication channels established between the first and second client devices. In another example, the authentication message(s) may be transferred via one or more attachable storage media devices which may be first attached to the one client device (e.g. the first client device) and then attached to the other client device (e.g. the second client device).

The second authenticator may then transmit the authentication message(s) back to the authentication management system which may verify whether the authentication message(s) received from the first authenticator are valid compared to the authentication message(s) transmitted to the first authenticator. The order of events described herein above is exemplary and may be altered as may be apparent to a person skilled in the art. For example, rather than first authenticating the user by the first authenticator, transmitting the authentication message(s) to the authenticator after it authenticates the user and receiving the authentication message(s) from the second authenticator, the order of event may include first sending the authentication message(s) to the first authenticator which may transfer them to the second authenticator, authenticating the user using the second authenticator followed by authenticating the user using the first authenticator.

In case of a successful verification of the authentication message(s), the first authenticator may be successfully associated with the user and verified for authenticating the user based on one or more identity assurance indicators, for example, one or more of the identity assurance indicators which are verified for the second authenticator which were used during the trust transfer process. This means that while the first authenticator may be typically associated with the user based on one (first) identity assurance indicator (e.g. password, phone number, email account, biometric signature, etc.), after trust is transferred from the second authenticator to the first authenticator, the first authenticator is now associated (bound) with the (second) identity assurance indicator(s) associated with the second authenticator. The first authenticator may be thus enabled to authenticate the user for accessing secure online resource(s) requiring either the first identity assurance indicator and/or the second identity assurance indicator(s).

As stated herein before, the trust transfer process may follow an alternative but very similar flow with one main exception. After the user is successfully authenticated by both the first authenticator and the second authenticator, instead of transmitting the authentication message(s) to the first authenticator, the authentication management system may transmit the authentication message(s) to the second authenticator. The authentication message(s) may be then transferred from the authenticator to the first authenticator using one or more of the methods and/or techniques described herein before for transferring the authentication message(s) from the first authenticator to the second authenticator. The second authenticator may then transmit the authentication message(s) back to the authentication management system which may continue the flow as described above, i.e. in case of successful verification of the authentication message(s), the first authenticator may be associated with the user and verified for authenticating the user accessing the secure online resource(s) based on the identity assurance indicator(s) verified for the second authenticator.

Optionally, after receiving the authentication message(s) from the authentication management system, instead of transferring the authentication message(s) to the first authenticator, the second authenticator may prompt the user to respond to the authentication message(s) via the second authenticator. For example, the user may be requested to confirm that he is indeed currently attempting to access the secure online resource(s) using the first authenticator. In particular, the user must respond to the authentication message(s) within a predefined time period to enable the authentication management system to verify that the second authenticator is operated by the user during the same trust transfer process currently in progress with the first authenticator. In case the response is received from the second authenticator within the predefined time period, the authentication management system may determine that the first and second authenticators are associated with the same user and may thus associate the first authenticator with the user and further verify the first authenticator for authenticating the user accessing the secure online resource(s) based on the identity assurance indicator(s) verified for the second authenticator.

Each of the authenticators associated with the user may be assigned an authenticator record listing the identity assurance indicators verified for the respective authenticator. The authenticator records may be stored, managed and maintained, for example, by the authentication management system.

It should be noted that the authenticators as well as the trust transfer authentication process are not necessarily aimed to identify the real identity of the user but rather to ensure that the user has access and control of the first and second authenticators. Authenticating the real world identity of the user may be done using one or more legacy authentication methods as known in the art and/or based on one or more of the identity assurance indicators.

The trust transfer process may be further applied to associate together multiple (two or more) authenticators which are already associated with the user and for which one or more of the identity assurance indicators are already verified. For example, assuming a first identity assurance indicator is verified for a first authenticator while a second identity assurance indicators is verified for a second authenticator. The authenticator records of the first and second authenticators are updated accordingly to reflect this.

Based on consent of the user a trust transfer process as described herein above may be initiated and the two authenticators may be associated with each other and thus verify the first identity assurance indicators for the second authenticator and the second identity assurance indicators for the first authenticator. For example, the authenticator records of the first and second authenticators may be unified such that the unified authenticator record lists a union of the identity assurance indicators listed in the original two authenticator records of the first and second authenticators, specifically the first and second identity assurance indicators. As such due to the trust transfer process, the first authenticator may be now verified for the user based on second identity assurance indicator even though the second identity assurance indicator was never directly verified for the first authenticator. The same is true for the second authenticator which may be now verified for the user based on first identity assurance indicator even though the first identity assurance indicator was never directly verified for the second authenticator.

Moreover, multiple (two or more) authenticators associated together as result of a trust transfer process may inherit additional identity assurance indicators acquired by one or more of the associated authenticators. Continuing the previous example, assuming that after the first and second authenticators are associated together, the first authenticator is verified for the user based on an additional, third, identity assurance indicator. In such case the third identity assurance indicator may be automatically and immediately valid also for the second authenticator. In particular, the unified authenticator record of the first and second authenticators may be updated to list the third identity assurance indicator thus validating it for both the first and second authenticators.

Optionally, the authenticators and the authentication management system may be deployed to provide and/or support a unified authentication service for authenticating the user for accessing multiple secure online resources of the plurality of secure online resources instead of deploying a specific authenticator to independently authenticate the user for accessing each of the secure online resources separately.

The trust transfer based authentication may present major benefits and advantages over currently existing methods and systems for user authentication.

First, the existing authentication systems may require each authenticator executed by each authentication client device to be independently and separately verified for the user by walking the user through one or more of the legacy authentication procedures which may be significantly long and user effort consuming. Transferring trust between authenticators and between authentication client devices may significantly reduce the number of times the user needs to go through the legacy authentication procedure thus significantly reducing the effort required by the user. Once one of the authenticators executed by one of the client devices used by the user is verified and associated with the user, one or more other authenticators executed by one or more other client devices used by the user may be also verified by trust transfer rather than through the legacy authentication procedure(s). This effort reduction may have a dramatic positive impact in modern times where users may use multiple different client devices for accessing the secure online services.

Moreover, applying the trust transfer, at least some of the authenticators may be associated with identity assurance indicators which they did not initially have. For example, a desktop authentication may not be initially associated with a phone number identity assurance. However, during a trust transfer conducted with another authentication device, for example, a mobile phone associated with the phone number identity assurance, the desktop may be also associated with the phone number identity assurance and may be used by the user for accessing secure online resource(s) requiring the phone number identity assurance.

Furthermore, the trust transfer is a very short and simple procedure which is mostly automatic and requires very little intervention of the user thus further reducing the effort of the user for verifying additional authenticators compared to the legacy authentication procedures.

In addition, the legacy authentication procedure(s) may require the user to separately perform the long and user effort consuming authentication for verifying each identity assurance indicator. The trust transfer on the other hand may enable immediate verification of multiple identity assurance indicators, which are verified for one or more authenticators, for one or more other authenticators. Moreover, the legacy authentication procedure(s) may require the user to separately verify a plurality of authenticators each associated with a respective one of the secure online services. Deploying the unified authentication service may therefore further reduce the effort required by the user since one or more common authenticators may be deployed to authenticate the user for accessing a plurality of the secure online services.

According to some embodiments of the present invention, there are provided methods, systems, devices and computer software programs for offloading biometric authentication of a user accessing secure online resources from one client device lacking biometric signature capturing capabilities to another client device(s) associated with the user which does have such biometric signature capturing capabilities. In other words, the user that is accessing the secure online resource(s) using a (first) client device which lacks (not equipped with) suitable biometric sensor(s) may be authenticated based on one or more of the biometric signatures captured by one or more other (second) client devices which are equipped with the suitable biometric sensor(s). These biometric sensor(s) may include, for example, an imaging sensor for capturing an iris pattern, a face pattern and/or the like, a tactile sensor for capturing fingerprint pattern, an audio sensor for capturing a voice pattern and/or the like.

When the user attempts to access the secure online resource using the first client device, an authentication request may be transmitted by the first client device and/or by the accessed secure online resource to the remote authentication system. In response to the authentication request, the remote authentication system may transmit a code to the first client device. The code which includes a link to an authentication webpage, specifically an authentication webpage associated with the authentication system may be transferred from the first client device to the second client device.

Specifically, transferring the code from the first client device to the second client device may be done without using any special application(s), mean(s) and/or provision(s) installed in the first and/or second client devices. In other words, the code may be transferred from the first client device to the second client device using only native application(s), mean(s) and/or provision(s) which are inherently installed in the first and/or second client devices thus requiring no further installation sequences and/or efforts by the user. For example, the code may comprise a QR code which may be presented on a screen of the first client device and scanned by a photograph talking application inherently installed on the second client device through one or more imaging sensors of the second client device, for example, a camera and/or the like. In another example, the code may be transferred to the second client device via one or more of the communication channels, for example, Infrared, near filed, Wi-Fi and/or the like established between the first client device and the second client device using one or more applications inherently installed on the first and second client devices. In another example, the code may be transferred to the second client device via one or more audio interfaces, for example, through a speaker of the first client device to a microphone of the second client device.

The second client device may then extract the link to the authentication webpage from the code and using the link may browse to the authentication webpage which may include instructions for authenticating the user based on the biometric signature(s) required by the secure online resource(s). In particular, the second client device may browse to the authentication webpage using no specially installed application but rather a web browser inherently installed in the second client device.

The second client device may then authenticate the user, using its biometric sensor(s), based on the required biometric signature(s). After successfully authenticating the user, the second client device may browse to the authentication webpage using its inherently installed web browser to transmit via the authentication webpage an authentication confirmation to the remote authentication system.

In response to receiving the authentication confirmation, the authentication system may grant the user access to the secure online resource(s) and/or inform the secure online resource(s) that the user is successfully authenticated based on the required biometric signature(s).

Offloading the biometric authentication from an incapable client device to a capable client device using only resources natively available in the client devices may present major advantages and benefits compared to existing authentication methods and systems.

First biometric authentication is considered a highly secure authentication scheme and may be thus required for accessing a plurality of secure online resources, is particular high security online resources. However, many devices used by users for accessing these secure online resources may lack biometric capturing means, specifically biometric sensor(s) and may be therefore incapable of biometrically authenticating the user. Users may therefore be unable to use such incapable client devices according to the existing authentication methods. This limitation is overcome by the biometric authentication offloading where the biometric authentication is done by a second client device associated with the user which is capable to biometrically authenticating the user.

Moreover, some of the existing authentication methods which support authentication offloading between client devices typically require installation of special and/or specific applications for conducting the offloading process. This requirement may be highly limiting since it may require installing a respective dedicated application on the second client device for each secure online resource the user attempts to access using the first client device. The dedicated applications which may amount to a large number may require computing resources (e.g. processing resources, storage resources, networking resources, etc.) which be costly in terms of resource utilization and/or performance of the client device. Moreover, operating the dedicated applications may require time, experience and/or knowledge which may significantly reduce the user experience of the user attempting to access the secure online resources. In contrast, offloading the biometric authentication using only resources natively available in the client devices, for example, the web browser, the image capturing application and/or the like and avoiding the installation and/or execution of dedicated applications may significantly reduce the resource utilization of the client device as well as increase the user experience of the accessing user. Moreover, enabling technology has developed to further automate at least some of the operations required from the second client device to biometrically authenticate the user thus reducing user invention and further improving the user experience. For example, when pointing the camera of a smartphone client device on a QR code, the QR code may be automatically scanned and in case the QR code comprises a link to a webpage, for example, a Uniform Resource Locator (URL), a network address and/or the like, a native web browser inherently installed in the smartphone may be automatically launched to browse to the linked webpage.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process of associating an authentication device used by a user for accessing a secure online resource based on another authentication device already associated with the user, according to some embodiments of the present invention.

An exemplary process 100 may be executed by an authentication system to associate a first authentication device used by a user to access one or more secure online resources with the user based on association of the user with another authentication device which is already associated with the user based on one or more identity assurance indicators bounding the other authentication device to the user.

In other words, the authentication system may execute the process 100 to transfer trust between the other (second) authentication device to the (first) authentication device used by the user to access the secure online resource(s). Specifically, the process 100 may be executed to transfer trust from a (second) authenticator module executed by the second authentication device to a (first) authenticator module executed by the first authentication device.

Figure 2A:
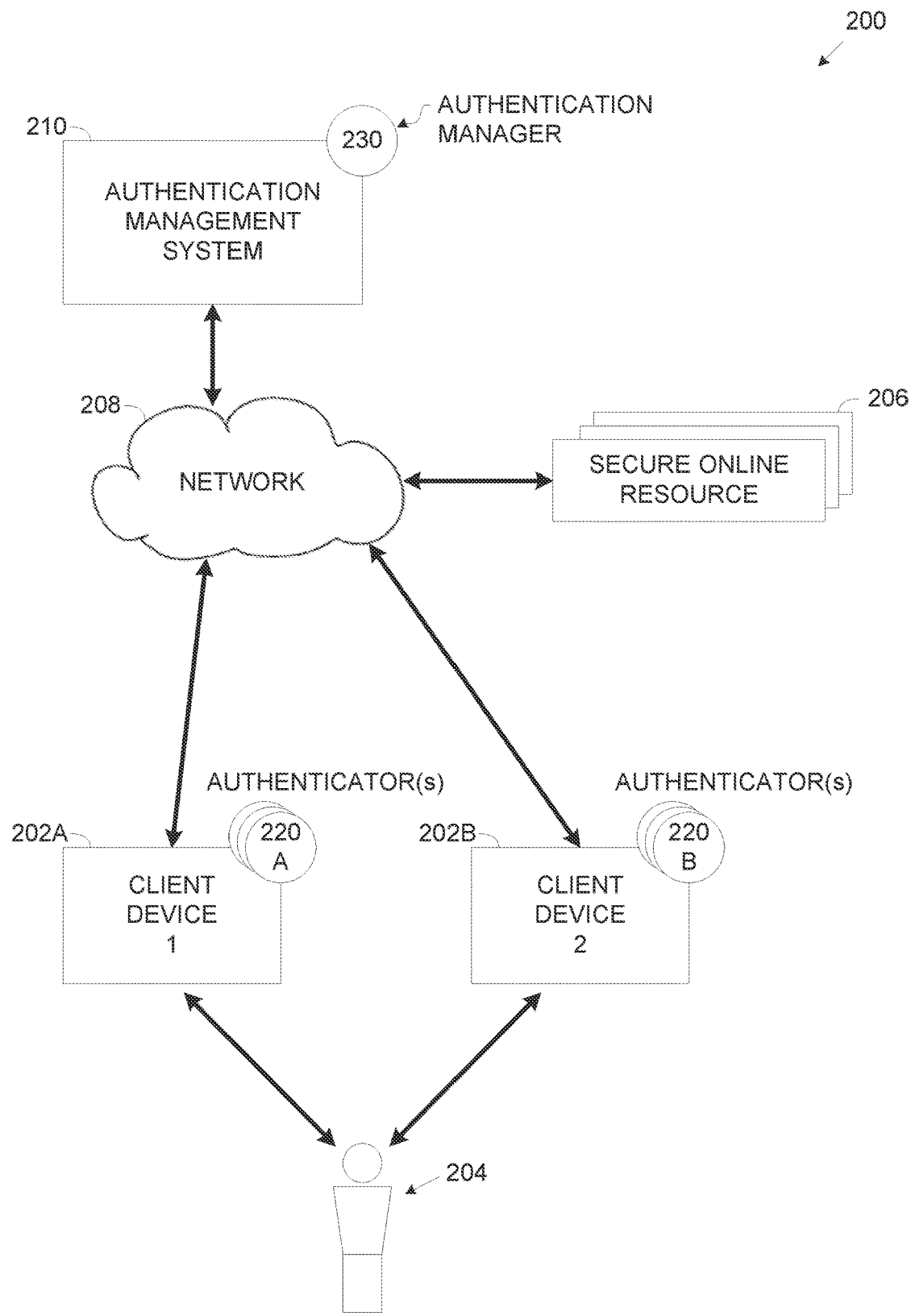
FIG. 2A and FIG. 2B are schematic illustrations of an exemplary system for associating an authentication device used by a user for accessing a secure online resource based on another authentication device already associated with the user, according to some embodiments of the present invention.
Figure 2B:
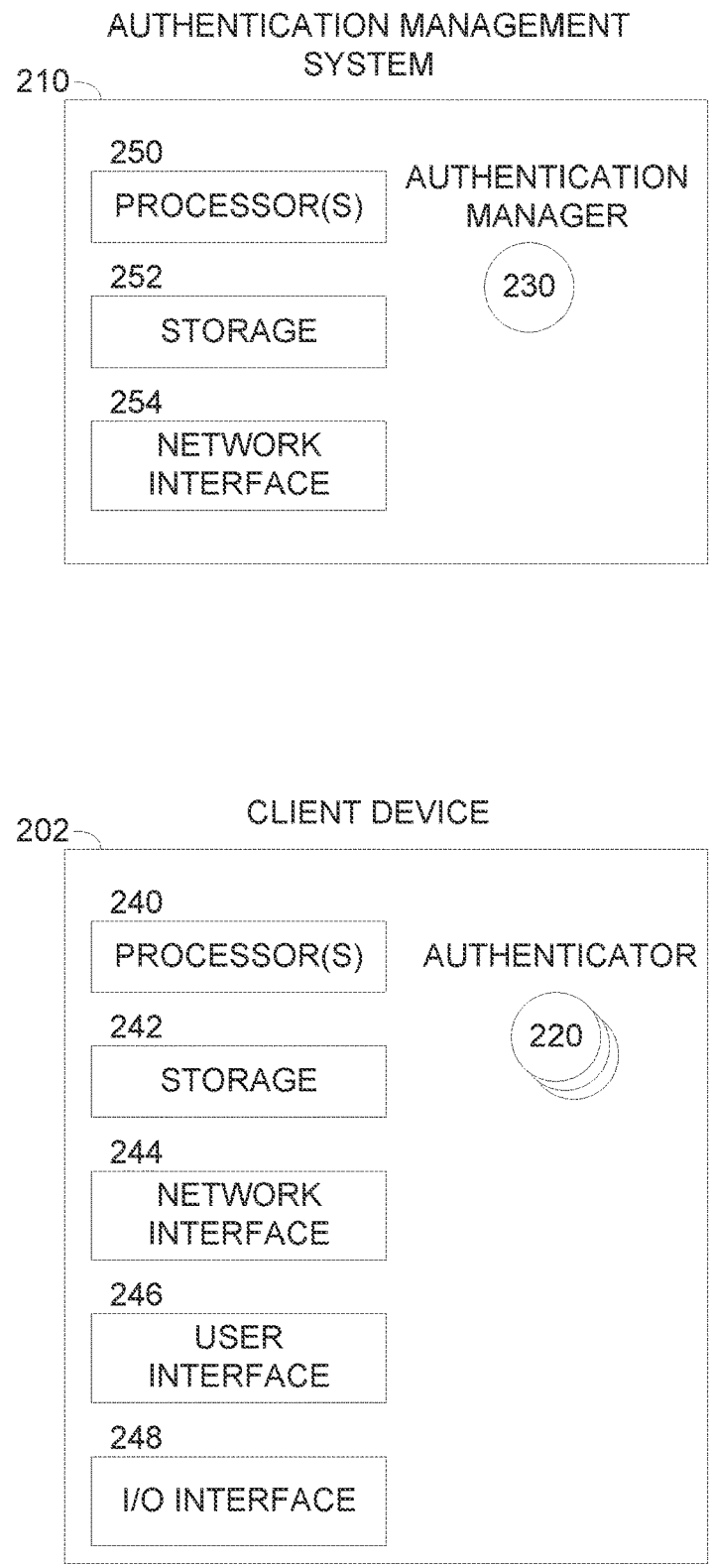

Reference is also made to FIG. 2A and FIG. 2B, which are schematic illustrations of an exemplary system for associating an authentication device used by a user for accessing a secure online resource based on another authentication device already associated with the user, according to some embodiments of the present invention.

As seen in FIG. 2A, in an exemplary 200, a user 204 may use one or more client devices 202, for example, a server, a desktop computer, a laptop computer, a Smartphone, a tablet, a proprietary client device and/or the like to access one or more secure online resources 206. Moreover, the user may use multiple client devices 202, for example, a first client device 202A and a second client device 202B for accessing one or more of the secure online resources 206.

The secure online resources 206 are accessible to the user 204 using the client device(s) 202 via a network 208 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

The secure online resources 206 may include, for example, a secure service, a secure system, a secure platform and/or the like such as, for example, an online finance service (e.g. a banking service, a credit/debit card service, etc.), a remote access system, an entertainment content streaming service and/or the like. The secure online resources 206 may be utilized by, for example, a server, a computing node, a cluster of computing nodes, a cloud service, cloud platform, cloud application and/or the like accessible to the client devices 202 via the network 208. The user 204 may therefore typically use an application locally executed by his client device 202 to access the remote secure resources 206B, for example, a web browser, a local agent, an access utility and/or the like.

In order to ensure their security, safety and/or privacy, access to the secure online resources 206 may be restricted such that the user 204 needs to first be authenticated to verify his identity and his access privileges to the secure online resources 206 before granted access to them.

One or more of the client devices 202 used by the user 204 may therefore execute one or more authenticator modules 220, typically software modules, configured to authenticate the user 204 before granting him access to the secure online resource(s) 206. Each of the authenticators 222 may employ one or more authentication methods and/or modalities as known in the art, for example, a secret known only to the user, a device in exclusive possession of the user, a biometric signature of the user and/or the like.

The system 200 may further include an authentication management system 210 connected to the network 208 and executing an authentication manager software module 230 for managing the authenticators 220, in particular for transferring trust between authenticators 220. The authentication manager 230 may transfer trust by communicating with the authenticators 220 and associating one authenticator, for example, a first authenticator 220A executed by the first client device 202A with the user 204 based on an existing and verified association of the user 204 with a second authenticator 220B executed by the second client device 202B.

As seen in FIG. 2B, the client device 202 may comprise a processor(s) 240, a storage 242 for storing data and/or code (program store), a network interface 244, a user interface 246 for interacting with the user 204 and optionally an Input/Output (I/O) interface 248 for connecting to one or more external and/or attachable devices.

The processor(s) 240, homogenous or heterogeneous, may include one or more processing nodes and/or cores arranged for parallel processing, as clusters and/or as one or more multi core processor(s). The storage 242 may include one or more non-transitory persistent storage devices, for example, a Read Only Memory (ROM), a Flash array, a Solid State Drive (SSD), a hard drive (HDD) and/or the like. The storage 242 may also include one or more volatile devices, for example, a Random Access Memory (RAM) component, a cache and/or the like.

The network interface 244 may include one or more wired and/or wireless network interfaces for connecting to the network 208, for example, a LAN interface, a WLAN interface, a WAN interface, a MAN interface, a cellular interface and/or the like. Via the network interface 244, the client device 202 may access the secure online resources 206 and/or communicate with the remote authentication system 210.

The user interface 246 may include one or more Human-Machine Interfaces (HMI) for interacting with the user 204, for example, a keyboard, a touchpad, a pointing device, a touchscreen, a screen, a digital pen, a speaker, an earphone, a microphone and/or the like.

The I/O interface 248 may include one or more wired and/or wireless I/O interfaces, for example, a Universal Serial Bus (USB) port, a serial port, a Bluetooth (BT) interface, a Radio Frequency (RF) interface, an infrared (IR) interface, a Near Field (NF) interface and/or the like for communicating and/or attaching to one or more external devices and/or attachable devices, for example, a USB key dongle, a USB mass storage device, a wireless (e.g., RF, IR, NF, etc.) key and/or the like.

The I/O interface 248 may further include one or more imaging sensors, for example, a camera, a scanner and/or the like for scanning one or more documents, for example, an ID card, a machine readable representation such as, for example, a barcode, a QR code and/or the like. The I/O interface 218 may also include one or more audio input and/or output interfaces configured to capture and/or generate respectively audible data, i.e. voice, speech, sound and/or the like. the I/O interface 248 may optionally include one or more biometric sensors and/or devices, for example, a tactile senor configured for fingerprint capture, an imaging sensor configured to capture iris and/or face patterns, a microphone configured to capture voice and/or the like.

The processor(s) 240 may execute one or more software modules such as, for example, a process, a script, an application, an agent, a utility, a tool and/or the like each comprising a plurality of program instructions stored in a non-transitory medium (program store) such as the storage 242 and executed by one or more processors such as the processor(s) 240. Optionally, the processor(s) 240 may include one or more hardware elements integrated in the client device 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like. The processor(s) 240 may further include or be supported by one or more security oriented hardware elements, for example, a security coprocessor such as, for example, a secure enclave, a Trusted Execution Environment (TEE) and/or the like.

For example, the processor(s) 240 may execute one or more software modules, for example, a web browser, a local agent, an access utility and/or the like for accessing one or more of the remote secure online resources 206.

The processor(s) 240 may further execute one or more authentication functional modules, for example, the authenticator 220 which may be implemented by one or more software modules, one or more of the hardware elements and/or a combination thereof for authenticating the user 204 before granting him access to one or more of the secure online resources 206. Each of the authenticators 220 may be configured to authenticate the user 204 based on one or more authentication processes, for example, password based authentication, biometric signature based authentication (e.g. fingerprint, iris, face, voice, etc.). Each of the authenticators 220 may be further associated with the user 204 based on one or more identity assurance indicators expressing a bound of the user 204 to the respective authenticator 220. However, one or more of the authenticators 220 may be further associated (bound) with one or more additional identity assurance indicators by transferring trust to the respective authenticator 220 from one or more other authenticators 220 as described in the process 100.

Each of the identity assurance indicators may be based and/or utilize one or more authentication methods and/or authentication modalities as known in the art, for example, a secret known only to the user 204, a device and/or a resource (e.g. phone number, email account, attachable key device, etc.) in exclusive possession of the user 204, a biometric signature of the user 204 and/or the like. For example, one or more of the identity assurance indicators may be knowledge based, for example, a secret code, a password and/or the like uniquely assigned to each user 204 and thus assumed to be known only to the respective user 204. In another example, one or more of the identity assurance indicators may be a based on a device and/or resource, for example, a phone, a tablet, a phone number, an email account, an identity document (e.g. ID card, passport, etc.), a key device and/or the like which is uniquely associated with the user 204 and thus assumed to be accessible and/or controllable only by the user 204. In another example, one or more of the identity assurance indicators may be biometric based, for example, a fingerprint pattern, an iris pattern, a face pattern, a voice signature and/or the like which uniquely identify each user 204 and thus assumed to be positively verified only for the respective user 204.

Each of the authenticators 220 executed by one or more of the client devices 202 used by the user 204 is uniquely associated with the user 204 and may authenticate the user 204 through one or more of the authentication processes based on one or more of the authentication data items (e.g. password, biometric signature, etc.) verified for the respective authenticator 220. For example, assuming a certain authenticator 220 is configured to authenticate the user 204 based on one or more of the authentication processes, for example, based on a secret code. When authenticating the user 204, the certain authenticator 220 may prompt the user 204 to enter his secret code (e.g. via a keyboard, a touchscreen, a microphone, etc.) and may authenticate the user 204 by verifying the provided secret code against a verified code of the user 204. In another example, assuming a certain authenticator 220 is configured to authenticate the user 204 based on a phone number of a certain client device 220 used by the user 204, for example, a cellular phone. When authenticating the user 204, the certain authenticator 220 may initiate transmission of a message, for example, a Short Message Service (SMS) message comprising a code, typically a One Time Password (OTP) to the cellular phone of the user 204. The certain authenticator 220 may then request the user 204 to provide the transmitted code within a predefined time period and may authenticate the user 204 by verifying the provided code against the transmitted code sent to the phone number verified for the user 204. In another example, assuming a certain authenticator 220 is configured to authenticate the user 204 based on a certain biometric signature, for example, a fingerprint pattern of the user 204. When authenticating the user 204, the certain authenticator 220 may obtain a fingerprint of the user, for example, via the tactile sensor of the client device 202 executing the certain authenticator 220 and may authenticate the user 204 by verifying the obtained fingerprint pattern to a verified fingerprint pattern of the user 204.

The verified authentication data items used for the authentication processes, for example, the verified code of the user 204, the verified fingerprint pattern of the user 204, a verified voice pattern of the user 204, a verified face pattern of the user 204 and/or the like may be locally stored in the client device 202, for example, in the storage 242 accessible to the certain authenticator 220. However, one or more of the identity assurance items verified for the user 204 may be remotely stored in one or more remote networked resources, for example, the authentication management system 210 accessible by the certain authenticator 220.

The initial verification of the identity assurance indicators may be done using one or more legacy authentication processes applied to exclusively associate the at least one identity assurance indicator with the user 204. Such legacy authentication processes may include, for example, an online authentication process in which the user 204 authenticates himself. In another example, one or more identity assurance indicators may be verified via an in-person phone call conducted with the user 204. In another example, the user 204 may be required to physically visit one or more offices to verify one or more identity assurance indicators associated with him, for example, an ID card of the user 204, a secret code uniquely assigned to the user 204, secret information (e.g. security questions, etc.) associated with the user 204 and/or the like. In another example, one or more identity assurance indicators, for example, ID card, personal information and/or the like may be verified by accessing one or more government agencies, offices and/or the like storing such private data.

For example, assuming the user uses a client device 202, for example, a cellular phone to access a certain secure online resource 206 requiring an SMS-based assurance which is practically translated to the phone number identity assurance indicator. Further assuming that a certain authenticator 220, for example, a fingerprint based authenticator is executed by the cellular phone to authenticate the user 204 for the first time which means that the phone number identity assurance indicator was never established for the certain authenticator 220. In such case the user 204 may be requested to go through an extensive online authentication process which may be very long, tiresome and/or tedious for the user 204. For example, in response to an attempt of the certain authenticator 220 to authenticate the user 204, an SMS message containing an OTP may be sent to the cellular phone having the phone number associated with the user 204. In case the OTP code SMS message is received at the cellular phone (client device 204) used by the user 204, the user 204 may provide the received OTP to the certain authenticator 220 which may now authenticate the user accordingly. Moreover, the phone number identity assurance indicator is now verified for the certain authenticator 220. As such, in subsequent future events when the certain authenticator 220 is invoked to authenticate the user 204 accessing the certain secure online resource 206 requiring the SMS-based assurance, the OTP SMS message process will not be repeated since the phone number identity assurance indicator is already verified for the certain authenticator 220 which may authenticate the use 204 accordingly.

As evident, it is possible that one or more of the authenticators 220 may be associated (bound) with multiple identity assurance indicators, for example, with one or more additional identity assurance indicators verified for use by the respective authenticator 220 following a trust transfer process such as the process 100. This means that even though a certain authenticator 220 may not be capable of authenticating the user 204 based on a first identity assurance indicator, when accessing a certain secure online resource 206 which require authentication based on another (second) identity assurance indicator, the certain authenticator 220 may be used to authenticate the user 204 accessing the certain secure online resource 206 in case the second identity assurance indicator is associated (bound) with the certain authenticator 220 as result of a trust transfer process.

Each identity assurance indicator verified for one of the authenticators 220 may be logged and stored in an authenticator record (interchangeably designated assumed holder) associated with the respective authenticator 220. As such a plurality of unique authenticator records may be maintained each for a respective one of the authenticators 220 to list the identity assurance indicator(s) verified for the respective authenticator 220. The authenticator records may be stored in one or more networked resources, for example, the authentication management system 210, specifically in the storage 252 of the authentication management system 210.

Continuing the previous example, after the phone number identity assurance indicator is verified for the certain authenticator 220, the authenticator record of the certain authenticator 220 may be updated to include the phone number identity assurance indicator.

The authentication management system 210, for example, a server, a computing node, a cluster of computing nodes and/or the like may comprise a network a processor(s) 250 such as the processor(s) 240 for executing the authentication process 100 and/or part thereof, a storage 252 for storing data and/or code (program store) and a network interface 254 such as the network interface 254 for connecting to the network 208.

The processor(s) 234, homogenous or heterogeneous, may include one or more processing nodes arranged for parallel processing, as clusters and/or as one or more multi core processor(s). The storage 252 may include one or more non-transitory persistent storage devices, for example, a ROM, a Flash array, an SSD, an HDD and/or the like, as well as one or more volatile devices, for example, a RAM component, a cache and/or the like. The storage 252 may further comprise one or more network storage devices, for example, a storage server, a Network Accessible Storage (NAS), a network drive, a database server and/or the like accessible through the network interface 254.

The processor(s) 250 may execute one or more software modules each comprising a plurality of program instructions stored in a non-transitory medium (program store) such as the storage 252 and executed by one or more processors such as the processor(s) 250. The processor(s) 250 may further utilize one or more hardware elements integrated in remote authentication management system 210, for example, a circuit, a component, an IC, an ASIC, an FPGA, a DSP, a GPU, a network processor and/or the like.

The processor(s) 250 may therefore execute one or more functional modules implemented using one or more software modules, one or more of the hardware modules and/or combination thereof. For example, the processor(s) 250 may execute the authentication manager 230 for executing the process 100.

Optionally, the authentication management system 210, specifically the authentication manager 230 may be implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

It should be noted, that the authentication process in which the user 204 is first authenticated before granted access to the secure online resource(s) 206 is primarily conducted by one or more of the authenticators 220. However, the authentication process and/or part thereof may be supported and/or conducted in conjunction with the authentication management system 210, specifically with the authentication manager 230. For example, the authentication manager 230 may be configured to transfer trust between authenticators 220 as described herein after in detail and/or to maintain the authenticator records for the plurality of authenticators 220.

The process 100 and the system 200 describe a single user 204 using two client devices 202 for accessing one or more of the secure online resources 206. This, however, should not be construed as limiting since the process 100 and the system 200 may be expanded for a plurality of users such as the user 204 each using a plurality of client devices such as the client device 202 for accessing one or more of the secure online resources 206. Moreover, the process 100 and the system 200 may be further extended to support additional client devices 202 (e.g. third, fourth and so on) used by the user 204. Furthermore, one or more of the client devices 202 used by one or more of the users 204 for accessing one or more of the secure online resources 206 may execute a plurality of authenticators 220 which may be associated with the user 204.

As shown at 102, the process 100 starts with the authentication manager 230 receiving an authentication request, via the network 208, from a first authenticator 220A executed by a first client device 202A (first authentication device) used by the user 204 for accessing one or more of the secure online resources 206. In particular, the first authenticator 220A is not associated (verified) with the user 204 meaning that no identity assurance indicators associated with the user 204 are verified for the first authenticator 220A.

For example, the user 204 may try to access a secure online resource 206, for example, an online bank account using the first client device 202A, for example, a home desktop computer executing the first authenticator 220A. Moreover, assuming that the first authenticator 220A was never used before to authenticate the user 204 attempting to access the secure online resource 206, the first authenticator 220A is not associated (verified) with the user 204. In other words, no identity assurance indicator of the user 204 is verified for the first authenticator 220A.

As shown at 104, the authentication manager 230 may transit one or more authentication messages to the first authenticator 220A.

The authentication message(s) may be then transferred from the first authenticator 220A to a second authenticator 220B executed by a second client device 202 (second authentication device) used by the user 204, for example, the client device 202B. As such, the authentication message(s) may be transferred from the first authenticator 220A to a second authenticator 220B only if both the first client device 202A and the second client device 202B are controllable and/or accessible by the user 204. This means that the authentication message(s) are used to correlate between the two authenticators, i.e., the first authenticator 220A and the second authenticator 220B during a certain trust transfer session. The authentication message(s) may therefore include a session ID, a secret code and/or the like to uniquely identify the trust transfer session and the involved authenticators, i.e., the first and the second authenticators.

The second authenticator 220B is already associated with the user 204 based on one or more identity assurance indicators of the user 204 meaning that these identity assurance indicator(s) are already verified for the second authenticator 220B. For example, the second client device 202B used by the user 204 may be a cellular phone executing the second authenticator 220B which is already associated with the use 204 based on one or more identity assurance indicators of the user 204, specifically, the phone number identity assurance indicator.

Moreover, one or more of the identity assurance indicators verified for the second authenticator 220B are such identity assurance indicators which are required by the secure online resource 206 that the user 204 attempts to access. For example, assuming the accessed secure online resource 206 is an online banking account requiring an SMS-based verification, the second authenticator 220B may be such an authenticator for which the SMS verification, specifically the phone number identity assurance indicator is already verified.

Therefore, since different secure online resources 206 may require different identity assurance indicators, typically depending on their security level, an appropriate second authenticator 220B may be selected which supports the identity assurance indicator(s) required by the respective accessed secure online resource 206, i.e. the required identity assurance indicator(s) of the user 204 are verified for the selected second authenticator 220B. For example, one or more lower security secure online resources 206 such as, for example, an online magazine subscription may require a simple email account based authentication (email identity assurance indicator). In another example, a high security secure online resource 206 such as, for example, an online banking account may require extensive authentication of the user 204 before granted access to the online banking account based on one or more identity assurance indicators, for example, a phone number identity assurance indicator (SMS-based verification), an ID document identity assurance indicator and/or the like. Furthermore, one or more of the secure online resources 206, typically high security secure online resources 206, may require authentication of the user 204 based on a plurality of identity assurance indicators, for example, the phone number identity assurance indicator (SMS-based verification), the ID document identity assurance indicator and the email identity assurance indicator.

The authentication message(s) may be transferred between the first authenticator 220B and the second authenticator 220A using one or more techniques, methods and/or algorithms.

For example, the secret code included in the authentication message(s) may be transferred from the first authenticator 220A to the second authenticator 220B by the user serving as intermediary. For example, the authentication messages(s) transmitted to the first authenticator 220A may include a textual secret code, for example, a numerical code, a string and/or the like which may be presented to the user 204 via the user interface 246 of the second client device 202B, for example, a display, a speaker and/or the like. The user 204 having access and/or control over both the first client device 202A and the second client device 202B may then transfer (provide) the received secret code to the second authenticator 220B via the user interface 246 of the second client device 202B, for example, a keyboard, a microphone and/or the like. In another example, the authentication messages(s) transmitted to the first authenticator 220A may include a QR code which may be displayed via the user interface 246 of the first client device 202A, specifically via the display of the first client device 202A. The user 204 may then transfer the code to the second authenticator 220B by locating an imaging sensor and/or a scanner of the second client device 202B with respect to the display of the first client device 202A displaying the QR code to enable the second client device 202B to capture the QR code.

In another example, the authentication message(s), in particular the secret code may be transferred from the first authenticator 220A to the second authenticator 220B via one or more communication channels established between the first client device 202A and the second client device 202B. Such communication channel(s) may include wired communication channels such as, for example, a USB link, a serial channel and/or the like. In another example, the communication channel(s) may include one or more wireless communication channels such as, for example, WLAN (e.g. Wi-Fi), BT, RF and/or the like.

In another example, the authentication message(s), specifically the secret code may be transferred from the first authenticator 220A to the second authenticator 220B via one or more attachable storage media devices, for example, a USB memory stick. The attachable storage device may be first attached to the first client device 202A to enable the first authenticator 220A to store the authentication message(s) in the attachable storage device. The attachable storage device may be then detached form the first client device 202A and attached to the second client device 202B to enable the second authenticator 220B to retrieve the authentication message(s) from the attachable storage device.

As shown at 106, the authentication manager 230 may receive the authentication message(s), from the second authenticator 220B, via the network 208, after the authentication message(s) is transferred from the first authenticator 220A to the second authenticator 220B. As stated herein before, reception of the authentication message(s), transmitted to the first authenticator 220A, from the second authenticator 220B may indicate that both the first authenticator 220A and the second authenticator 220B which have authenticated the same user 204 are thus correlated with this user 204 having access and/or control over them, specifically over the first client device 202A and the second client device 202B.

The authentication message(s), for example, the secret code, the session ID and/or the like which is transmitted by the authentication manager 230 to the first authenticator 220A may typically be based on an OTP code configured and/or defined to have a predefined expiration time after which the OTP code becomes invalid. Using the OTP code may prevent malicious attacks in which a secret code transmitted during a previous session and which was intercepted by a malicious party may be used during succeeding authentication session(s) to gain control over the first authenticators 220A. Applying the expiration time may further increase robustness of the authentication session since receiving the OTP code within the predefined expiration time may ensure that the user 204 has both the first client device 202A and the second client device 202B readily available for transferring the secret code. On the other hand, receiving the OTP code after a prolonged time period, specifically after the expiration of the expiration time may indicate that a potential malicious party attempting to compromise one or more of the authenticators 220 associated with the user 204 may not have both the first client device 202A and the second client device 202B readily available. Therefore, in case the OTP code received by the authentication manager 230 after the expiration time expires, the authentication manager 230 may determine that the received OTP code is invalid.

As shown at 108, which is a conditional step, in case the authentication manager 230 determines that the authentication message(s), for example, the secret code received from the first authenticator 220A is valid, the process 100 branches to 110. Otherwise, in case the authentication message(s) is determined to be invalid, the process 100 may branch to 114 and end.

The authentication manager 230 may determine that the authentication message(s) is valid by comparing between the authentication message(s) received from the second authenticator 220B to the authentication message(s) transmitted to the first authenticator 220A. In case of a match between the transmitted and received authentication message(s), the authentication manager 230 may determine that the authentication message(s) is valid. In case of no match, the authentication manager 230 may determine that the authentication message(s) is invalid. Moreover, in case the authentication message(s) comprises an OTP having an expiration time, the authentication manager 230 may determine that the authentication message(s) is valid only if received before the expiration time has expired.

As shown at 110, since the authentication manager 230 determines that the authentication message(s) is invalid, the process 100 ends without associating the first authenticator 220A with the user 204 and failing the authentication of the user 204 by the first authenticator 220A thus preventing accessing of the user 204 to the secure online resource 206.

As shown at 112, after determining that the received authentication message(s) is valid, the authentication manager 230 may associate the first authenticator 220A executed by the first client device 202A with the user 204.

As shown at 114, after associating the first authenticator 220A with the user 204, the authentication manager 230 may enable the first authenticator 220A to authenticate the use 204 for accessing the secure online resource 206.

Moreover, the authentication manager 230 may verify for the first authenticator 220A the identity assurance indicator(s) already verified for the second authenticator 220B which were used in the process 100. This means that in subsequent authentication sessions, the first authenticator 220A may authenticate the user 204 for accessing the secure online resource 206 without going through the process 100 since the first authenticator 220A is already associated with the user 204. In particular, the first authenticator 220A may authenticate the user 204 based on the identity assurance indicator(s) now also verified for the first authenticator 220A.

The order of events described in the process 100 for transferring trust between the second authenticator 220B and the first authenticator 220A is exemplary and may be altered to follow one or more different paths as may be apparent to a person skilled in the art. The sequence described in the process 100 includes first authenticating the user 204 by the first authenticator 220A, transmitting the authentication message(s) to the first authenticator 220A and receiving the authentication message(s) from the second authenticator 220A after it authenticates the user 204 and the authentication message(s) is transferred to the second authenticator 220B from the first authenticator 220A. Another exemplary order of event may include, for example, first sending the authentication message(s) to the first authenticator 220A, transferring them to the second authenticator 220B, authentication of the user 204 by the second authenticator 200B followed by authentication of the user 204 by the first authenticator 220A and only then receiving the authentication message(s) from the second authenticator 220B.

Continuing the previously presented example, assuming the phone number identity assurance indicator is already verified for the second authenticator 220B, executed by the second client device 202B which is the cellular phone of the user 204, the authentication manager 230 may verify the phone number identity assurance indicator also for the first authenticator 220A executed by the first client device 202A, namely the home desktop computer.

Alternatively, the trust transfer process 100 may be conducted in a very similar flow with one main exception. After the user 104 is successfully authenticated by both the first authenticator 220A and the second authenticator 220B, instead of transmitting the authentication message(s) to the first authenticator 220A, the authentication manager 230 may transmit the authentication message(s) to the second authenticator 220B. The authentication manager 230 may identify the second authenticator 220B according to identification information received from the user 204 using the first authenticator 220A, for example, a phone number of the second client device 202B, an email address associated with the second authenticator 220B and/or the like. After transmitted to the second authenticator 220B, the authentication message(s) may be transferred from the second authenticator 220B to the first authenticator 220A using one or more of the methods and/or techniques described herein before for transferring the authentication message(s) from the first authenticator 220A to the second authenticator 220B. The second authenticator 220B may then transmit the transferred authentication message(s) back to the authentication manager 230. The authentication manager 230 may proceed with the process 100 as described above, i.e. in case of successful verification of the authentication message(s), the first authenticator 220A may be associated with the user 104 and verified to authenticate the user 204 for accessing the secure online resource 106 based on the identity assurance indicator(s) verified for the second authenticator 220B.

In another optional flow of the process 100 which is derived from the alternative flow, the authentication message(s) transmitted by the authentication manager 230 are not transferred to the first authenticator 220A. Rather, after receiving the authentication message(s) from the authentication manager 230, the second authenticator 220B may prompt the user 204 to respond to the authentication message(s) via the second authenticator 220B. For example, the user 204 may be requested to confirm to the authentication manager 230, via the second authenticator 220B, that he (the user 204) is currently using the first authenticator 220A for accessing the secure online resource(s). For example, the user 204 may be requested, by the second authenticator 220B, to type, insert and/or otherwise provide the confirmation to the second authenticator 220B which in turn may transmit the confirmation to the authentication manager 230. In particular, the user 204 must respond to the authentication message(s) within a predefined time period such that the authentication manager 230 is capable of correlate the response received from the user 204 operating the second authenticator 220B with the same trust transfer process currently in progress with the first authenticator 220A. In case the response is received from the second authenticator 220B within the predefined time period, the authentication manager 230 may determine that the first authenticator 220A and second authenticator 220B are associated with the same user 204. The authentication manager 230 may thus associate the first authenticator 220A with the user 204 and further verify the first authenticator 220A to authenticate the user 204 for accessing the secure online resource 206 based on the identity assurance indicator(s) verified for the second authenticator 220B.

As described hereon before, an authenticator record (assumed holder) may be maintained for each of the authenticators 220 associated with the user 204 to list each identity assurance indicator verified for the user 204 using the respective authenticator 220. In case the users 204 is associate with a plurality of authenticators 220, a plurality of authenticator records may be maintained for the user 204 each for a respective one of the authenticators 220 associated with the user 204.

As stated herein before, the system 200 may be expanded to support a plurality of users such as the user 204 accessing one or more of the secure online resources 206 where each of the users 204 may be associated with one or more authenticators 220, specifically with instances of the authenticator(s) 220 executed by their respective client device(s) 202.

A plurality of authenticator records may be therefore maintained, for example, by the authentication manager 230 for the plurality of users 204. Each of the authenticator records is associated with one of the users 204 and may therefore list (a) one or more authenticator 220 associated with the respective user 204 and (b) each identity assurance indicator verified for the respective user 204 using the one or more associated authenticators 220.

The authenticator records may be stored in one or more forms, for example, a file, a table, a database and/or the like. one or more entities, for example, the authentication manager 230 may maintain the authenticator records of the authenticators 220, for example, add, remove, update and/or the like. As such, the authentication manager 230 may maintain a respective authenticator record logging each of the authenticators 220, for example the first authenticator 220A and the second authenticator 220B. For example, a first authenticator record of the first authenticator 220A may list each identity assurance indicator verified for the user 204 using the first authenticator 220A while a second authenticator record may list each identity assurance indicator verified for the user 204 using the second authenticator 220B.

In particular, during the process 100, after associating the first authenticator 220A with the user 204 for the first time, the authentication manager 230 may create an authenticator record (assumed holder) for the first authenticator 220A and may update the authenticator record of the first authenticator 220A to include the identity assurance indicator(s) now verified (during the process 100) for the first authenticator 220A.

Optionally, the authentication manager 230 may transfer trust between authenticators 220 typically based on consent of the user 204 for the trust transfer.

For example, during the process 100, specifically at the end of the process 100 after the second authenticator is associated with the user 204 and is logged in a respective authenticator record and based on consent of the user 204, the authentication manager 230 may transfer trust between the authenticators 220A and 220B. For example, at the end of the process 100 the authentication manager 230 may interact with the user 204, via the first client device 202A to get the user's consent (approval) for transferring trust between the authenticators 220A and 220B. In response to consent of the user 204, the authentication manager 230 may associate the first authenticator 220A with the second authenticator 220B. After associated together, each of the first authenticator 220A and the second authenticator 220B may inherit all identity assurance indicators which are verified for the first authenticator 220A and for the second authenticator 220B. For example, the authentication manager 230 may unify the authenticator records of the first authenticator 220A and the second authenticator 220B into a single unified authenticator record which lists (comprises) a union of all identity assurance indicator listed in the first authenticator record and in the second authenticator record.

Moreover, assuming one or more additional identity assurance indicators are verified in the future for the user 204 using a certain authenticator 220 which is associated with one or more other authenticators 220 and thus shares a unified authenticator record with the other authenticator(s) 220, the authentication manager 230 may update the unified authenticator record to list each such additional identity assurance indicator. This means that the other authenticator(s) 220 which were not directly verified for the additional identity assurance indicator(s) may inherit these additional identity assurance indicator(s) since they are associated with the certain authenticator 220 for which the additional identity assurance indicator(s) is verified. For example, assuming the first authenticator 220A and the second authenticator 220B are associated together and share a unified authenticator record. Further assuming that the user 204 authenticates using the first authenticator 220A for accessing a certain secure online resource 206 for which an additional (new) identity assurance indicator is required which is naturally not listed in the unified authenticator record of the first and second authenticators 220A and 220B. After going through an authentication process, for example, a legacy authentication process in which the additional (new) identity assurance indicator is verified for the second authenticator 220B, the authentication manager 230 may update the unified authenticator record to include the additional identity assurance indicator. As such the additional identity assurance indicator may become valid also for the second authenticator 220B which was not directly verified for the additional identity assurance indicator but may inherit the additional identity assurance indicator since it is associated with the first authenticator 220A and shares the same unified authenticator record with the first authenticator 220A.

Optionally, the authentication management system 210, specifically the authentication manager 230 may be configured to support and/or provide a (unified) authentication service for accessing multiple online resources 206 of the plurality of secure online resources 206. In particular, one or more authenticators 220 associated with the user 204 may be used to authenticate the user 204 accessing each of the multiple online resources 206. This may eliminate the need to maintain and invoke a plurality of unique authenticators 220 each applicable for only a single secure online resource 206 and capable of authenticating the user 204 when accessing the respective secure online resource 206. Maintaining a plurality of such authenticators 220 may lead to major redundancy in which the user 204 may need to go through multiple legacy exhaustive authentication processes for verifying the same identity assurance indicator(s) for different authenticators 220 each capable of operating for different one of the secure online resources 206.

Using a unified authentication service in which the same authenticator(s) 220 may be applicable for the multitude of secure online resources 206 and may be used for authenticating the user 204 accessing these secure online resources 206 may significantly reduce such redundancy and significantly reduce the effort of the user 204 required for verifying the identity assurance indicator(s) for the authenticator(s) 220.

In particular, the unified authentication service may be based on the authenticator record(s) of the authenticator(s) 220 associated with the user 204. For example, assuming a certain authenticator 220 associated with the user 204 is verified for using multiple identity assurance indicators, for example, the phone number identity assurance indicator, the email account identity assurance indicator, the biometric signature (e.g. face recognition) identity assurance indicator and/or the like. Further assuming that a first secure online resource 206 and a second secure online resource 206 require SMS-based verification, i.e. authenticating the user 204 based on the phone number identity assurance indicator. In such case the same certain authenticator 220, which is verified for the phone number identity assurance indicator, may be used for authenticating the user 204 when accessing either the first secure online resource 206 or the second a secure online resource 206. Moreover, assuming that the first secure online resource 206 requires SMS-based verification while the second secure online resource 206 requires email account verification. In such case the same certain authenticator 220, which is verified for both the phone number identity assurance indicator and the email account identity assurance indicator, may still be used for authenticating the user 204 when accessing either the first secure online resource 206 or the second a secure online resource 206

Figure 3:
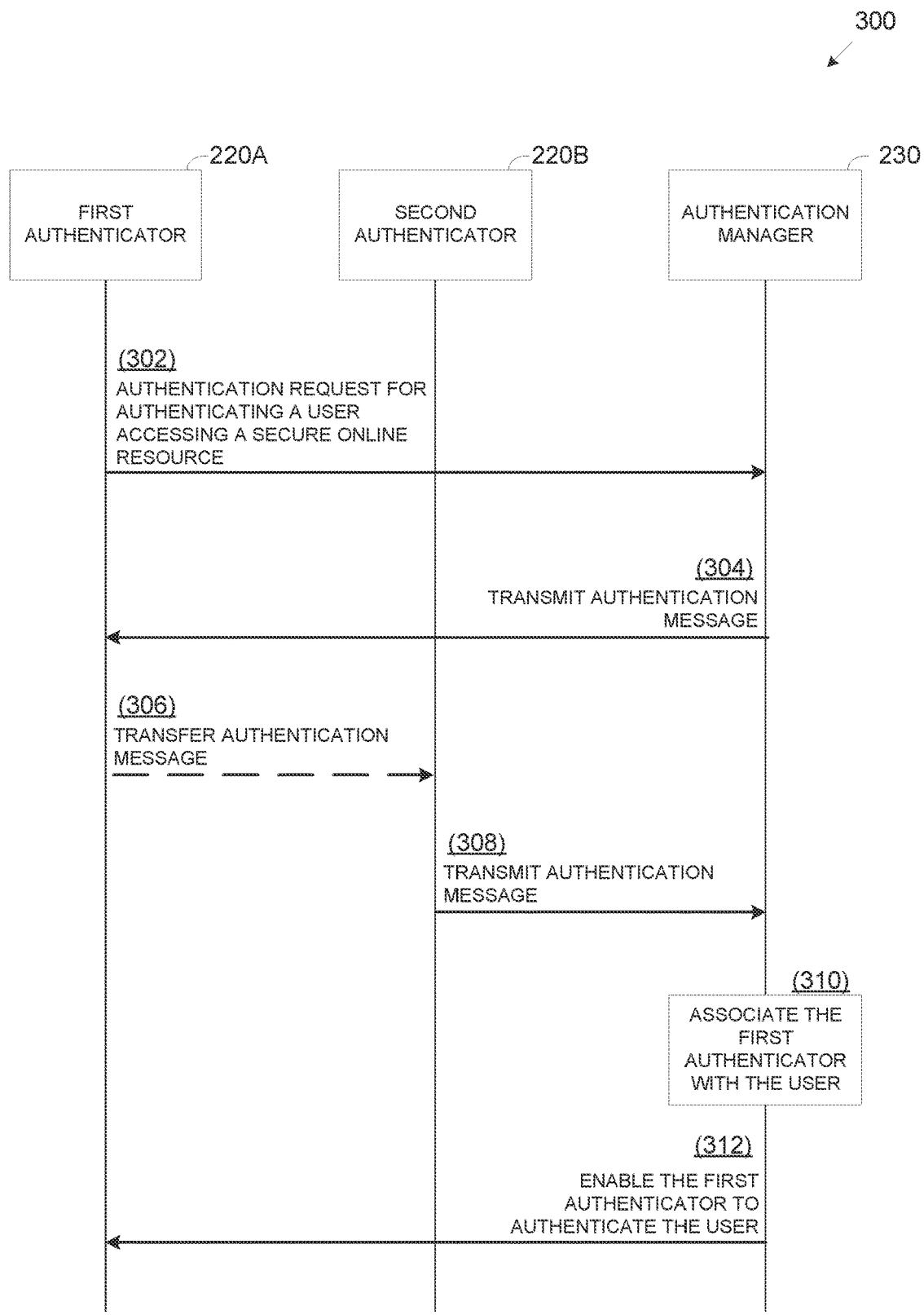
FIG. 3 is a schematic illustration of an exemplary flow of associating an authentication device used by a user for accessing a secure online resource based on another authentication device already associated with the user, according to some embodiments of the present invention.

Reference is now made to FIG. 3, which is a schematic illustration of an exemplary flow of associating an authentication device used by a user for accessing a secure online resource based on another authentication device already associated with the user, according to some embodiments of the present invention.

An exemplary flow 300 may be conducted between an authentication manager such as the authentication manager 230, a first authenticator such as the first authenticator 220A executed by a first client device such as the first client device 202A and a second authenticator such as the second authenticator 220B executed by a second client device such as the second client device 202B for associating the first authenticator 220A with a user such as the user 204 and enabling the first authenticator 220A to authenticate the user 204 accessing one or more secure online resources such as the secure online resources 206.

As seen in the flow, 300, after invoked to authenticate a user 204 using the first client device 202A, for example, a desktop computer to access the secure online resource 206, the first authenticator 220A may first authenticate the user 204. In case of a successful authentication the first authenticator 220A may transmit (302) an authentication request to the authentication manager 230. Since it may be the first time the first authenticator 220A is used, the first authenticator 220A may not be associated with the user 204 at the authentication manager 230 and may be thus unable to authenticate the user 204 for accessing the secure online resource 206.

In response, the authentication manager 230 may transmit (304) one or more authentication messages to the first authenticator 220A. The authentication message(s) may include a secret code encoded as a textual string, an image code (e.g., a QR code, a barcode, etc.) and/or the like. For example, the authentication manager 230 may transmit a QR code to the first authenticator 220A which may cause the first client device 202A to present the QR code to the user 204. Typically, authentication message(s), for example, the secret code may be an OTP code assigned with a predefined expiration time.

After the user 204 is successfully authenticated by the second user 204 and assuming both the first client device 202A and the second client device 202B are accessible and controllable by the user 204 and are located on the same premises, the authentication message(s), specifically the secret code may be transferred (306) from the first authenticator 220A to the second authenticator 220B. The authentication message(s) may be transferred in one or more ways, for example, by the user 204 serving as an intermediator, via one or more communication channels established between the first client device 202A and the second client device 202B, via an attachable storage media and/or the like. For example, assuming the second client device 202B is a mobile phone equipped with an imaging sensor (e.g., camera), the user 204 may operate the second client device 202B to scan the QR code presented by the first client device 202A to provide the secret code encoded in the QR code to the second authenticator 220B.

The second authenticator 220B may then transmit (308) the transferred authentication message(s) back to the authentication manager 230 which may validate the received authentication message(s) by comparing it to the authentication message(s) initially transmitted to the first authenticator 220A and optionally verifying that the expiration time of the authentication message(s) has not expired.

In case the authentication manager 230 determines that the received authentication message(s) is valid, the authentication manager 230 may associate (310) the first authenticator 220A with the user 204. The authentication manager 230 may further verify (associate) one or more identity assurance indicators of the user 204 for the first authenticator 220A, in particular, identity assurance indicator(s) which are already verified for the second authenticator 220B.

By associating the first authenticator 220A with the user 204, the authentication manager 230 practically enables (312) the first authenticator 220A to authenticate the user 204 for accessing the secure online resource(s) 206 based on one or more of the identity assurance indicator(s) verified for the first authenticator 220A.

As stated herein above, the order of events, actions and/or operations described in the flow 300 for transferring trust between the second authenticator 220B and the first authenticator 220A is exemplary. Other alternative sequences may be applied to achieve the same end result as may be apparent to a person skilled in the art. The trust transfer process may be demonstrated through an exemplary use case described herein after which expresses the benefits of transferring trust between authenticators 220 executed by different client devices 202 (authentication devices) and further demonstrates the benefits of sharing an authentication service using common authenticators 220 for accessing multiple secure online resources 206 (relying parties).

The user 204 may use a client device 202C, for example, a mobile phone to access a certain secure online resource 206, for example, www(dot)acme(dot)com, which requires that an authentication process may be conducted on login using an authenticator 220 which is verified to use SMS-based assurance, i.e. the phone number identity assurance indicator.

To be authenticated for accessing www(dot)acme(dot)com, the user 204 may invoke, for the first time, an authenticator 220C on the mobile phone 202C. Invoked for the first time, the authenticator 220C obviously does not have this assurance established, i.e., the phone number identity assurance indicator was never verified for the authenticator 220C.

Therefore, as part of the authentication session, after successfully authenticated by the authenticator 220C, for example, based on a fingerprint pattern, the user 204 may be requested to establish the phone number identity assurance indicator for the authenticator 220C. In response to consent of the user 204, the user 204 will be asked to provide the phone number of the cellular device and an OTP code (authentication message) may be transmitted to the cellular device. The user 204 is then requested to provide (transfer) the received OTP code via the authenticator 220C.

After the OTP code is verified, the authenticator 220C is now associated with the user 204 and the phone number identity assurance indicator is now verified for the authenticator 220C and the authenticator record of the authenticator 220C may be updated accordingly.

It should be noted that the authentication process is not aimed to identify the real identity of the user 204 but rather to ensure that the user 204 is has access and control of the cellular device having the phone number the user 204 provided. Associating the phone number and a real world identity of the user 204 may be done using one or more legacy authentication methods as known in the art.

When the user 204, using the authenticator 220C, tries to login again to www(dot)acme(dot)com requiring the SMS-based assurance (phone number identity assurance indicator), the user 204 will not have to repeat the SMS OTP process since the authenticator 220C is already associated with "SMS-based assurance", i.e., the phone number identity assurance indicator is already verified for the authenticator 220C.

The user 204 may then try to access www(dot)acme(dot)com using another client device 202D, for example, a work laptop executing another authenticator 220D configured to authenticate the user 204 based on a biometric signature of the user 204, for example a fingerprint pattern which may be captured by a biometric scanner (tactile sensor) available in the work laptop 202D.

Since www(dot)acme(dot)com requires the SMS-based verification and the authenticator 220D is not associated with the phone number identity assurance indicator, the OTP code authentication may be repeated, after the user 204 agrees, and an OTP code is transmitted to the phone number previously provided by the user 204 and now recorded in the authenticator record of the authenticator 220C associated with the user 204. After authenticated by the authenticator 220D based on his biometric signature, the user 204 may transfer the OTP code received at his cellular phone to the authenticator 220D executed by the work laptop 202D.

The authenticator 220D may then transmit the OTP code and in case the OTP code is verified, the authenticator 220D may be associated with the user 204 based on the phone number identity assurance indicator. In other words, the phone number identity assurance indicator is now verified for the authenticator 220D executed by the work laptop 202D and the authenticator record of the authenticator 220D may be updated accordingly.

The user 204, using the work laptop 202D executing the authenticator 220D, may then try to perform a high-risk transaction on www(dot)acme(dot)com for which "ID card assurance" is required, i.e., an ID card identity assurance indicator needs to be verified for the authenticator 220D. The user 204 may be prompted to scan his ID card to prove his identity. Following a successful ID card scan the work laptop 202D will be marked as having "ID card assurance" meaning that the ID card identity assurance indicator is verified for the authenticator 220D and again, the authenticator record of the authenticator 220D may be updated accordingly.

At this point the authenticator 220D executed by the work laptop 202D is associated with two identity assurance indicators, namely the phone number identity assurance indicator and the ID card identity assurance indicator while the authenticator 220C executed by the mobile phone 202C is associated with only one identity assurance indicator—the phone number identity assurance indicator.

The user 204 may further attempt to access a second secure online resource 206, for example, www(dot)coyote(dot)com using yet another client device 202E, for example, a home desktop computer executing an authenticator 220E. The online service www(dot)coyote(dot)com may require an email account based authentication and the user 204 may be therefore requested to provide an email address and verify a message sent to the email account associated with the provided email address. The home desktop computer 202E may be thus marked as having "email based assurance", meaning that the email identity assurance indicator is verified for the authenticator 220E and the authenticator record of the authenticator 220E may be updated accordingly.

The user 204 may then perform a trust transfer process, as described herein before, between the authenticator 220E executed by the home desktop computer 202E and the authenticator 220C executed by the mobile phone 202C. As part of the trust transfer process, the two authenticator records of the authenticator 220C and the authenticator 220E may be unified to list a union of the identity assurance indicators listed in each of the two authenticator records. Following the trust transfer both the authenticator 220E and the authenticator 220C are therefore associated with both the phone number identity and the email address identity assurance indicators.

The user 204, using the home desktop computer 202E executing the authenticator 220E, may next perform another high-risk transaction on www(dot)acme(dot)com for which the "ID card assurance" is required, i.e., the ID card identity assurance indicator needs to be verified for the authenticator 220E. The user 204 may be prompted to scan his ID card to prove his identity. Following a successful ID card scan the home desktop computer 202E is marked as having "ID card assurance" meaning that the ID card identity assurance indicator is verified for the authenticator 220E and the authenticator record of the authenticator 220E, which is unified with the authenticator 220C, may be updated accordingly to list the ID card identity assurance indicator. The unified authenticator record of the authenticators 220C and 220E therefore now lists the phone number, the email address and the ID card identity assurance indicators. As result, the authenticator 220C is now also verified for the ID card identity assurance indicator by inherence from the authenticator 220E from which trust was previously transferred even though the ID card identity assurance indicator was not directly verified for the authenticator 220C.

The user 204 may further perform a trust transfer process between the authenticator 220D executed by the work laptop 202D and the authenticator 220C executed by the mobile phone 202C. During the trust transfer process, the authenticator record of the authenticator 220D and the authenticator record of the authenticator 220C (which is a unified record with the authenticator 220E) may be unified to list a union of the identity assurance indicators listed in each of the two authenticator records. Following the trust transfer all three authenticators 220, namely the authenticator 220C, the authenticator 220D and the authenticator 220E now share a unified authentication records listing all the identity assurance indicators verified for either one of them, specifically the phone number, the email address, the ID card and the biometric signature identity assurance indicators.

The user 204, using the mobile phone 202C executing the authenticator 220C, may then attempt to access a third secure online resource 206 (relying party), for example, www(dot)zoo(dot)com which requires extensive authentication based on ID card assurance, SMS verification and email account verification. The user 204 is not required to go through the exhausting authentication process described herein above since, following the trust transfer process, the authenticator 220C is already associated and verified for the three requested identity assurance indicators—the phone number, the email address and the ID card identity assurance indicators.

According to some embodiments of the present invention, biometric authentication of a user such as the user 204 accessing one or more of the secure online resources 206 may be offloaded from a first client device 202, for example, the client device 202A used by the user 204 to access the secure online resource(s) 206 to a second client device 202, for example, the client device 202B. In particular, the biometric authentication offload may be done when the first client device 202A lacks (not equipped) biometric signature capturing capabilities, specifically suitable one or more biometric sensors for capturing one or more biometric signatures required for accessing the secure online resource(s) 206. In such case the biometric authentication may be conducted by the second client device 202B which is equipped with the suitable biometric sensor(s), for example, an imaging sensor for capturing an iris pattern, a face pattern and/or the like, a tactile sensor for capturing fingerprint pattern, an audio sensor for capturing a voice pattern and/or the like.

Figure 4:
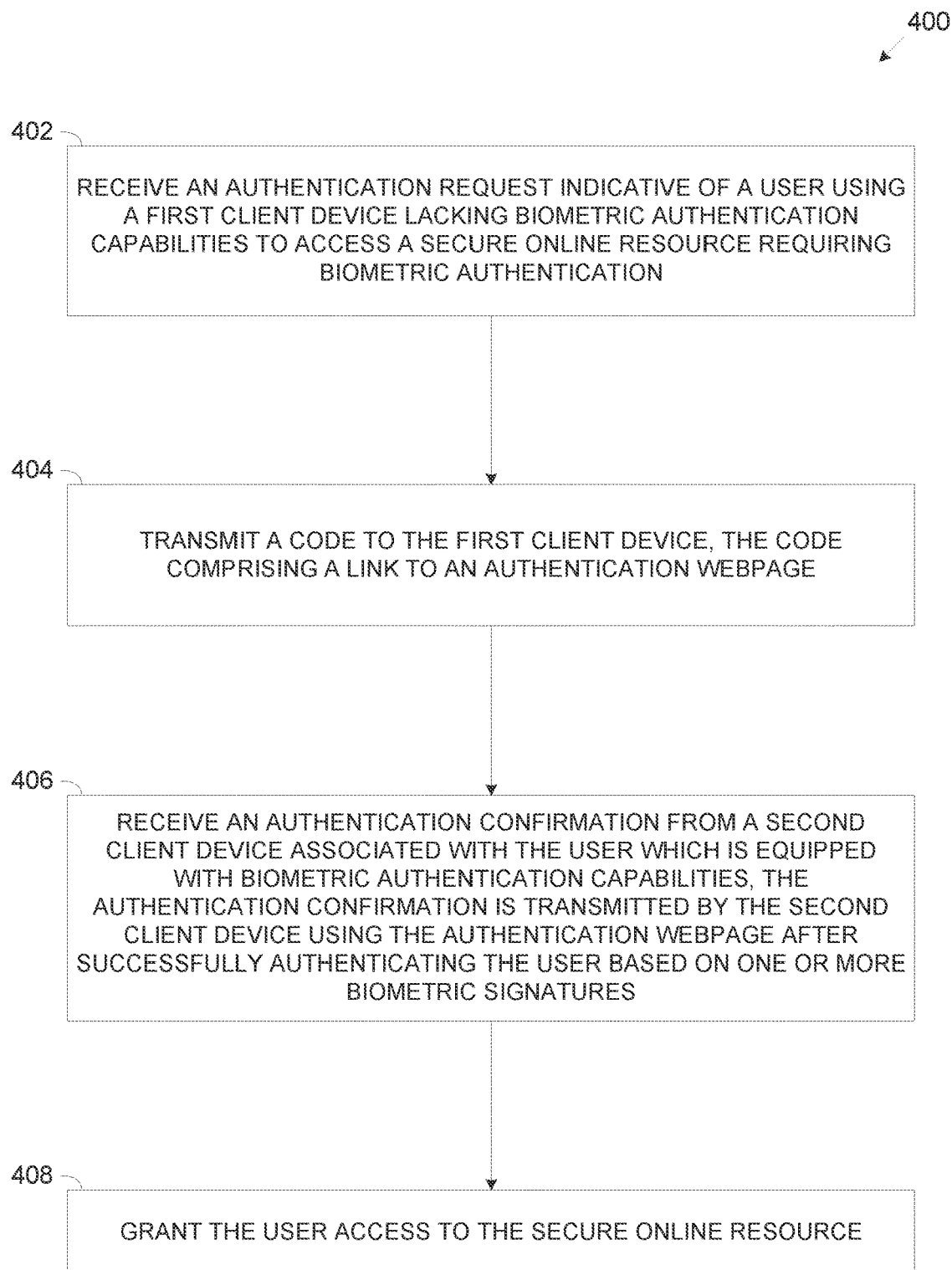
FIG. 4 is a flowchart of an exemplary process of offloading biometric authentication of a user accessing a secure online resource from a first client device incapable of biometric authentication to a second client device capable of biometric authentication, according to some embodiments of the present invention.

Reference is now made to FIG. 4, which is a flowchart of an exemplary process of offloading biometric authentication of a user accessing a secure online resource from a first client device incapable of biometric authentication to a second client device capable of biometric authentication, according to some embodiments of the present invention.

An exemplary process 100 may be executed by an authentication system such as the authentication system 210 to authenticate a user such as the user 204 using a first client device such as the client device 202, for example, the client device 202A lacking biometric authentication capabilities to access a secure online resource such as the secure online resource 206 which requires biometric authentication. In particular, the authentication may be done using another (second) client device 202, for example, the client device 202B which is equipped with biometric authentication capabilities and thus capable of biometrically authenticating the user 204. In particular, the second client device 202B may include one or more biometric sensors which may be used to capture one or more biometric signatures (patterns) of the user 204, for example, an imaging sensor for capturing an iris pattern, a face pattern and/or the like, a tactile sensor for capturing fingerprint pattern, an audio sensor for capturing a voice pattern and/or the like.

As shown at 402, the process 400 starts with the authentication system 210, specifically an authentication manager such as the authentication manager 230 receiving an authentication request indicting that the user 204, using the client device 202A, attempt to access the secure online resource 206 which requires biometric authentication based on one or more biometric signatures of the user 204, for example, the iris pattern, the face pattern, the fingerprint pattern, the voice pattern and/or the like.

The authentication request may be transmitted to the authentication system 210 by the first client device 202A and/or by the accessed secure online resource 206.

As shown at 404, in response to the authentication request, the authentication manager 230 may transmit a code to the first client device 202A. In particular, the code may include a link to an authentication webpage, specifically an authentication webpage associated with the authentication system 210 and/or with the authentication manager 230. The link may include, for example, a Uniform Resource Locator (URL), a network address and/or the like.

Assuming that both the first client device 202A and the second client device 202B are controllable and/or accessible by the user 204, the code may be transferred from the first client device 202A to the second client device 202B.

Specifically, transferring the code from the first client device 202A to the second client device 202B may be done without using any special application(s), mean(s) and/or provision(s) installed in the first and/or second client devices. This means that the code may be transferred from the first client device 202A to the second client device 202B using only native application(s), mean(s) and/or provision(s) which are inherently installed in the first client device 202A and/or the second client device 202B thus requiring no installation sequences and/or efforts by the user 204.

For example, the code may comprise a QR code which may be presented on a screen of the first client device 202A and scanned by a photograph talking application inherently installed on the second client device 202B through one or more imaging sensors of the second client device 202B, for example, a camera and/or the like. In another example, the code may be transferred to the second client device 202B via one or more communication channels, for example, Infrared, near filed, WLAN (e.g., Wi-Fi) and/or the like established between the first client device 202A and the second client device 202B using one or more applications inherently installed on the first and second client devices. In another example, the code may be transferred to the second client device via one or more audio interfaces, for example, through a speaker of the first client device 202A to a microphone of the second client device 202B.

The second client device 202B may extract the link to the authentication webpage from the code transferred from the first client device 202A. Using the extracted link, the client device 202B may browse to the authentication webpage which may include instructions for authenticating the user based on the biometric signature(s) required by the secure online resource 206. In particular, the second client device 202B may browse to the authentication webpage using no specially installed application but rather a web browser inherently installed in the second client device 202B.

The second client device 202B may then authenticate the user 204, using one or more of its biometric sensor(s), by verifying the biometric signature(s) as required for accessing the secure online resource 206. After successfully authenticating the user 204, the second client device 202B may browse to the authentication webpage using its inherently installed web browser to transmit via the authentication webpage an authentication confirmation to the remote authentication system 210, specifically to the authentication manager 230.

As shown at 406, the authentication manager 230 may receive the authentication confirmation.

As shown at 408, in response to receiving the authentication confirmation indicting a successful biometric authentication of the user 204, the authentication manager 230 may grant the user 204 access to the secure online resource 206. This may be done directly by the authentication manager 230 in case access to the secure online resource 206 is controlled by the authentication manager 230. In case, the authentication manager 230 is not configured to directly control access to the secure online resource 206, the authentication manager 230 may transmit one or more messages to inform the secure online resource 206 that the user is successfully authenticated and may be granted access.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms client device and authentication methods and/or modalities are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of associating an authentication device with a user using another authentication device already associated with the user, comprising:
using at least one processor for:
receiving an authentication request from a first authenticator executed by a first client device used by the user for accessing at least one secure online resource, the first authenticator is not associated with any user;
transmitting an authentication message to the first authenticator;
receiving the authentication message from a second authenticator executed by a second client device used by the user after the authentication message is transferred from the first authenticator to the second authenticator indicating that both the first authenticator and the second authenticator are controlled by the user, the second authenticator is already associated with the user based on at least one identity assurance indicator verified for the user;
associating the first authenticator with the user in case the received authentication message is valid; and
enabling the first authenticator to authenticate the user for accessing the at least one secure online resource based on the at least one identity assurance indicator.

2. The method of claim 1, further comprising transmitting the authentication message to the second authenticator and associating the first authenticator with the user after receiving, from the first authenticator, the authentication message transferred from the second authenticator to the first authenticator.

3. The method of claim 1, wherein the first authenticator is enabled to authenticate the user based on the at least one identity assurance indicator during subsequent future accesses of the user to the at least one secure online resource.

4. The method of claim 1, wherein the authentication message transmitted to the second authenticator is a member of a group consisting of: secret code and a randomly generated code assigned with an expiration time period.

5. The method of claim 1, wherein the authentication message is transferred from the first authenticator to the second authenticator by the user who receives the authentication message via the second authenticator.

6. The method of claim 1, wherein the authentication message is transferred from the first authenticator to the second authenticator via at least one communication channel established between the first client device and the second client device.

7. The method of claim 1, wherein the authentication message is transferred from the first authenticator to the second authenticator via an attachable storage media which is first attached to the first client device to enable the first authenticator to store the authentication message in the attachable storage media followed by detaching the attachable storage media from the second client device and attaching the attachable storage media to the second client device to enable the second authenticator to retrieve the authentication message from the attachable storage media.

8. The method of claim 1, wherein the at least one identity assurance indicator is uniquely associated with the user to enable authentication of the user by verifying its associated at least one identity assurance indicator.

9. The method of claim 8, wherein the at least one identity assurance indicator is initially verified for the user through a legacy authentication process applied to exclusively associate the at least one identity assurance indicator with the user.

10. The method of claim 1, wherein the first authenticator and the second authenticator are initially each logged in a respective authenticator record maintained for the user, a first authenticator record lists each identity assurance indicator verified for the user using the first authenticator and a second authenticator record lists each identity assurance indicator verified for the user using the second authenticator.

11. The method of claim 10, further comprising maintaining a plurality of authenticator records each for a respective one of a plurality of authenticators associated with the user.

12. The method of claim 10, further comprising, based on consent of the user, associating the first authenticator with the second authenticator and unifying the first authenticator record and the second authenticator record into a single unified authenticator record, the unified authenticator record lists a union of all identity assurance indicator listed in the first authenticator record and the second authenticator record.

13. The method of claim 12, further comprising updating the unified authenticator record to include each additional identity assurance indicator verified for the user using the first authenticator or the second authenticator such that the respective additional identity assurance indicator is valid for both the first authenticator and the second authenticator.

14. The method of claim 13, further comprising maintaining a plurality of authenticator records for a plurality of users accessing the at least one secure online resource, each of the plurality of authenticator records list (a) at least one authenticator associated with the respective user and (b) each identity assurance indicator verified for the respective user using the at least one associated authenticator.

15. The method of claim 14, further comprising providing an authentication service, based on the plurality of authenticator records maintained for the plurality of users, for accessing a plurality of secure online resources.

16. An authentication system for associating an authentication device with a user using another authentication device already associated with the user, comprising:
a program store storing a code; and
at least one processor of an authentication system coupled to the program store for executing the stored code, the code comprising:
code instructions to receive an authentication request from a first authenticator executed by a first client device used by the user for accessing at least one secure online resource, the first authenticator is not associated with any user;
code instructions to transmit an authentication message to the first authenticator;
code instructions to receive the authentication message from a second authenticator executed by a second client device used by the user after the authentication message is transferred from the first authenticator to the second authenticator indicating that both the first authenticator and the second authenticator are controlled by the user, the second authenticator is already associated with the user based on at least one identity assurance indicator verified for the user;
code instructions to associate the first authenticator with the user in case the received authentication message is valid; and
code instructions to enable the first authenticator to authenticate the user for accessing the at least one secure online resource based on the at least one identity assurance indicator.

17. A method of associating an authentication device with a user using another authentication device already associated with the user, comprising:
using at least one processor for:
receiving an authentication request from a first authenticator executed by a first client device used by the user for accessing at least one secure online resource, the first authenticator is not associated with any user;
receiving identification information identifying a second authenticator executed by a second client device used by the user, the second authenticator is already associated with the user based on at least one identity assurance indicator verified for the user;
transmitting an authentication message to the second authenticator;
receiving a response to the authentication message from the second authenticator within a predefined time period;
associating the first authenticator with the user; and
enabling the first authenticator to authenticate the user for accessing the at least one secure online resource based on the at least one identity assurance indicator.

* * * * *